(12) United States Patent
Chiba

(10) Patent No.: US 12,169,655 B2
(45) Date of Patent: Dec. 17, 2024

(54) IMAGE FORMING APPARATUS REMOTELY OPERATING TO ACHIEVE A BALANCE BETWEEN CONVENIENCE AND SECURITY, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Shinichi Chiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/474,370

(22) Filed: Sep. 26, 2023

(65) Prior Publication Data

US 2024/0103784 A1    Mar. 28, 2024

(30) Foreign Application Priority Data

Sep. 28, 2022   (JP) ................................. 2022-155295

(51) Int. Cl.
*G06F 3/12* (2006.01)
*H04L 9/00* (2022.01)

(52) U.S. Cl.
CPC .......... *G06F 3/1236* (2013.01); *G06F 3/1204* (2013.01); *G06F 3/1238* (2013.01); *G06F 3/1285* (2013.01); *G06F 3/1293* (2013.01); *H04L 9/00* (2013.01)

(58) Field of Classification Search
None
See application file for complete search history.

(56) References Cited

U.S. PATENT DOCUMENTS

| 12,028,326 B2* | 7/2024 | Kurihara ............ H04N 1/00307 |
| 2016/0117268 A1* | 4/2016 | Griffin .................. G06F 13/102 |
| | | 710/10 |
| 2022/0141205 A1 | 5/2022 | Kurihara |
| 2022/0141347 A1* | 5/2022 | Sumi .................. H04N 1/00424 |
| | | 358/1.15 |

FOREIGN PATENT DOCUMENTS

JP          2022073282 A     5/2022

* cited by examiner

*Primary Examiner* — Haris Sabah
(74) *Attorney, Agent, or Firm* — ROSSI, KIMMS & McDOWELL LLP

(57) ABSTRACT

An image forming apparatus comprises: a connection unit configured to connect with an information processing apparatus in order to allow execution of a remote operation of the image forming apparatus by the information processing apparatus; a detection unit configured to detect an event that has occurred in the image forming apparatus; and a disconnection unit configured to, in a case where occurrence of a predetermined event corresponding to a state of use of the image forming apparatus is detected by the detection unit while connected with the information processing apparatus by the connection unit, disconnect the connection with the information processing apparatus.

11 Claims, 14 Drawing Sheets

IMAGE FORMING APPARATUS REMOTELY OPERATING TO ACHIEVE A BALANCE BETWEEN CONVENIENCE AND SECURITY, CONTROL METHOD THEREOF, AND NON-TRANSITORY COMPUTER-READABLE STORAGE MEDIUM

BACKGROUND OF THE INVENTION

Field of the Invention

The present invention relates to an image forming apparatus, a control method thereof, and a non-transitory computer-readable storage medium.

Description of the Related Art

A function called a remote operation for remotely operating an image forming apparatus, such as a multifunction peripheral, is known. This function is realized using, for example, software called Virtual Network Computing (VNC). If VNC server software is running in an image forming apparatus, a remote operation of the image forming apparatus can be performed from an information processing apparatus, such as a PC or a mobile terminal, by using VNC client software (Japanese Patent Laid-Open No. 2022-73282).

When remotely operating an image forming apparatus, it is necessary to consider a balance between convenience and security. For example, if one forgets to disconnect a connection between an image forming apparatus and an information processing apparatus after a remote operation of the image forming apparatus by the information processing apparatus, a security concern may arise. With respect to this, it is conceivable, for example, to automatically disconnect a connection between the two apparatuses when a connected state has continued for a certain period of time. However, it is anticipated, for example, that connections will end up being disconnected during remote operation, and thus, convenience may deteriorate.

SUMMARY OF THE INVENTION

The present invention provides a technique for achieving a balance between convenience and security when remotely operating an image forming apparatus.

According to one aspect of the invention, there is provided an image forming apparatus comprising: a connection unit configured to connect with an information processing apparatus in order to allow execution of a remote operation of the image forming apparatus by the information processing apparatus; a detection unit configured to detect an event that has occurred in the image forming apparatus; and a disconnection unit configured to, in a case where occurrence of a predetermined event corresponding to a state of use of the image forming apparatus is detected by the detection unit while connected with the information processing apparatus by the connection unit, disconnect the connection with the information processing apparatus.

According to the present invention, it is possible to achieve a balance between convenience and security when remotely operating an image forming apparatus.

Further features of the present invention will become apparent from the following description of exemplary embodiments (with reference to the attached drawings).

DESCRIPTION OF THE EMBODIMENTS

Figure 1:
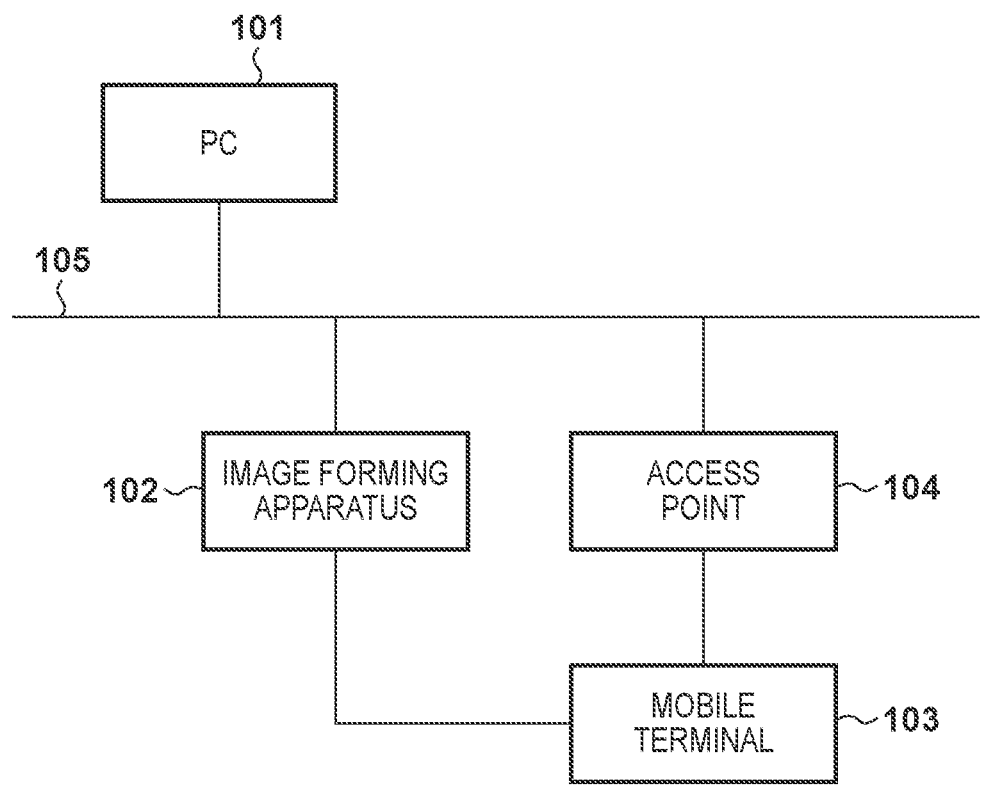
FIG. 1 is a diagram illustrating an example of a network configuration of a system that includes an image forming apparatus according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment

In the following, an image forming apparatus will be referred to as a server, and an information processing apparatus, such as a PC or a mobile terminal connected to the server by a Virtual Network Computing (VNC) connection or the like, will be referred to as a client. In the present embodiment, description will be given using as an example a network configuration that includes an image forming apparatus 102, which has a VNC server function and transmits a display screen, and a mobile terminal 103, which has a VNC client function and receives a display screen of the image forming apparatus 102. The server limits the number of clients that can connect and operate at the same time to one. The image forming apparatus 102 activates VNC server software and then waits for the client to be connected. The mobile terminal 103 activates VNC client software and then connects to a desired server. Communication between the server and the client is performed according to a Remote FrameBuffer (RFB) protocol. Communication according to the RFB protocol is well known, and thus, detailed explanation thereof will be omitted. Generally, in the RFB protocol, various arrangements are made by first performing handshake processing, and then information, such as a display screen, is transmitted and received.

<1.1. Example of Network Configuration (FIG. 1)>

FIG. 1 is a diagram illustrating an example of a network configuration of a system that includes an image forming apparatus according to one embodiment. The image forming apparatus 102, which has the VNC server function; a personal computer (PC) 101, which is an example of an information processing apparatus that has the VNC client function; and an access point 104 are connected to a local area network (LAN) 105. In addition, the mobile terminal 103, which is an example of an information processing apparatus that has the VNC client function, is connected to the LAN 105 via the access point 104. When the image forming apparatus 102 and the mobile terminal 103 have a wireless direct communication function, they can communicate directly without going through the LAN 105. In the following, description will be given using an example in which the mobile terminal 103, which has the VNC client function, establishes a VNC connection with the image forming apparatus 102, which has the VNC server function. However, another device that has the VNC client function (e.g., the PC 101, another image forming apparatus (not illustrated), or the like) may be connected to the image forming apparatus 102, which has the VNC server function.

<1.2. Image Forming Apparatus (FIGS. 2 and 3)>

<1.2.1. Hardware Configuration (FIG. 2)>

Figure 2:
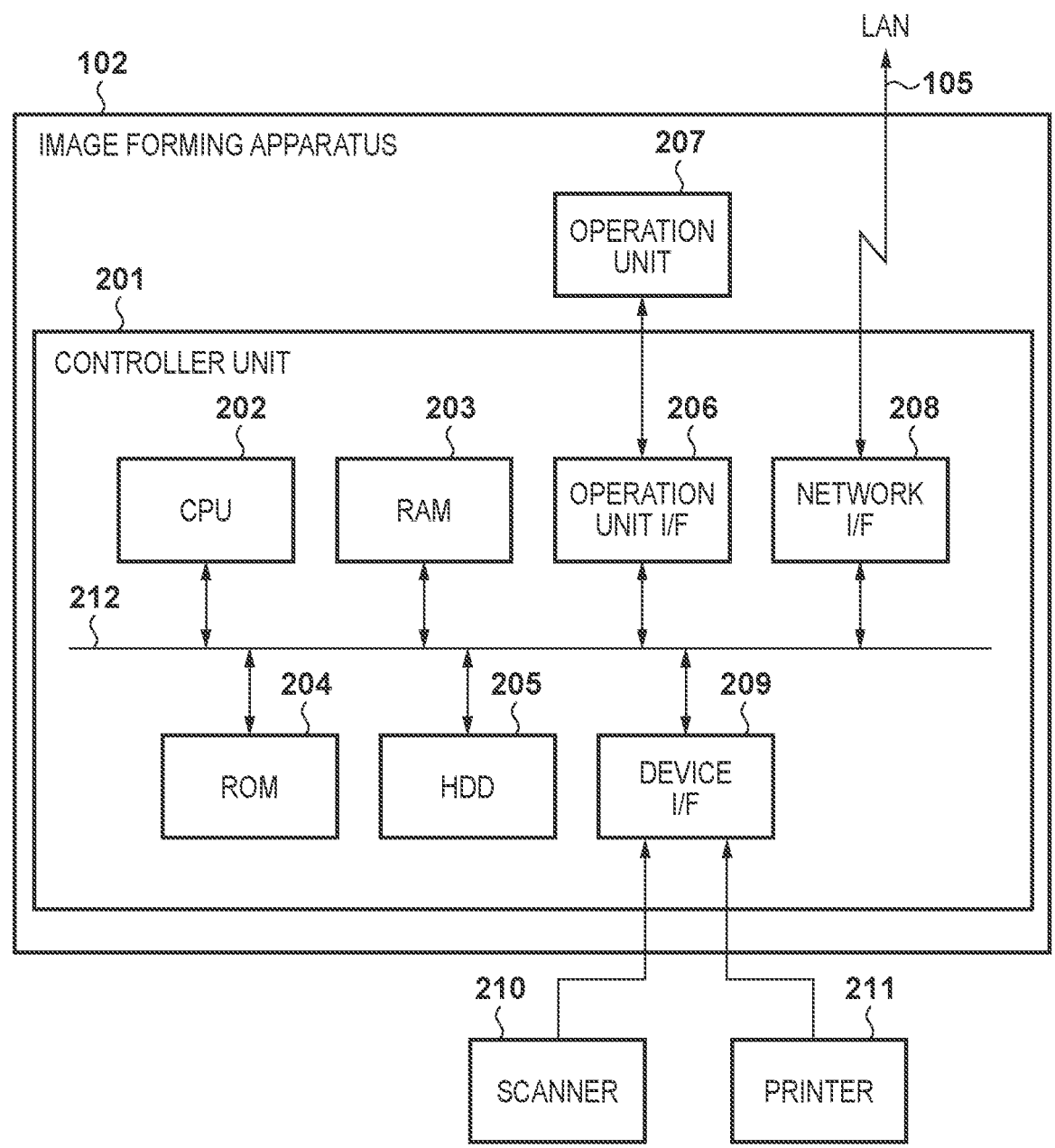
FIG. 2 is a hardware configuration diagram of the image forming apparatus.

FIG. 2 is a hardware configuration diagram of the image forming apparatus 102. The image forming apparatus 102 includes a controller unit 201 and an operation unit 207. First, components of the controller unit 201 will be described.

A CPU 202 is a computation apparatus for controlling the entire system. The CPU 202 collectively controls each device connected to a system bus 212. A ROM 204 is a non-volatile memory and stores image data and other data, various programs for the CPU 202 to perform operation, and the like. A RAM 203 is a volatile memory and is used as a temporary storage region, such as a main memory and a work area of the CPU 202. In addition, programs, such as an operating system, system software, and application software, and data are disposed in the RAM 203.

The CPU 202 controls each unit of the image forming apparatus 102 by loading a program stored in the ROM 204 or the like into the RAM 203 and then executing the program. The program for the CPU 202 to perform operation is not limited to a program stored in the ROM 204, and a program stored in advance in a hard disk drive (HDD) 205 or the like may be used.

The hard disk drive (HDD) 205 stores an operating system, system software, application software, image data, setting data, and the like. However, the HDD 205 is only one example, and another storage apparatus, such as a solid state drive (SSD), an SD memory card, or an embedded Multi Media Card (eMMC) may be used so long as data can be stored.

An operation unit I/F 206 is an interface unit for the operation unit 207 and outputs information to be displayed on the operation unit 207 to the operation unit 207. In addition, information inputted by the user is received from the operation unit 207.

A network I/F 208 is connected to the network (LAN) 105 and inputs and outputs information to and from the PC 101 connected to the same LAN, another image forming apparatus (not illustrated), and the like. In addition, the network I/F 208 is connected to the network (LAN) 105 and inputs and outputs information to and from the mobile terminal 103 via the access point 104.

A device I/F 209 connects a scanner 210 and a printer 211, which are image input/output devices, with the controller unit 201 and inputs and outputs image data.

The operation unit 207 includes a touch panel and physical keys for accepting a user operation. The touch panel is a panel configured to be flat and notifies the operation unit I/F 206 of information on coordinates of a position touched by the user. The physical keys are keys that can be physically pressed, such as numerical keys, a start key, and a stop key, and notify the operation unit I/F 206 when a key is pressed. The operation unit 207 also includes a display for displaying an image. The display receives a graphical user interface (GUI) screen generated by the CPU 202 from the operation unit I/F 206 and then displays the screen. By installing the touch panel to be integrated with an upper layer of the display, it is possible to control a screen displayed on the display as if the user is directly operating the screen.

<1.2.2. Software Configuration (FIG. 3)>

Figure 3:
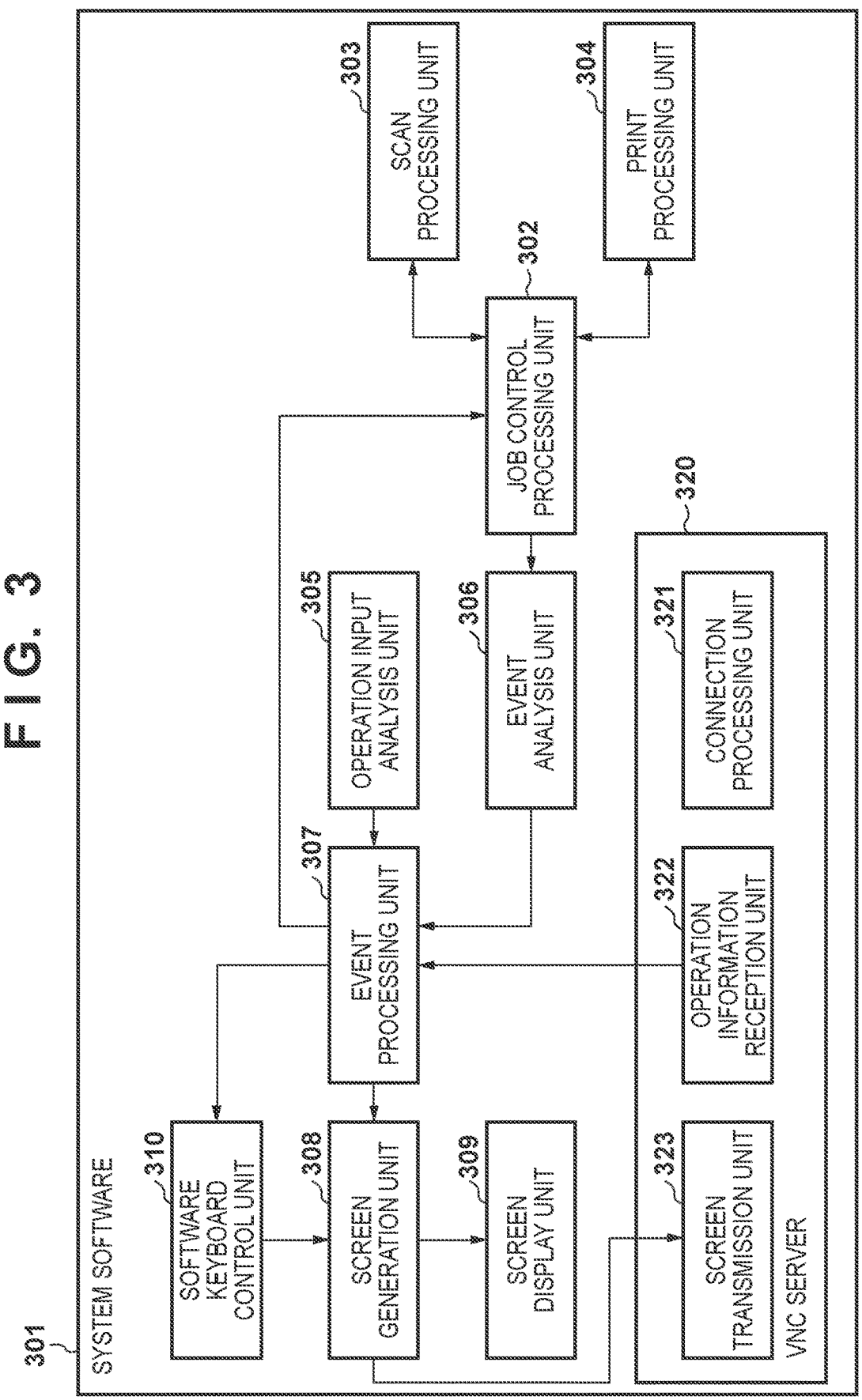
FIG. 3 is a software configuration diagram of the image forming apparatus.
Figure 6:
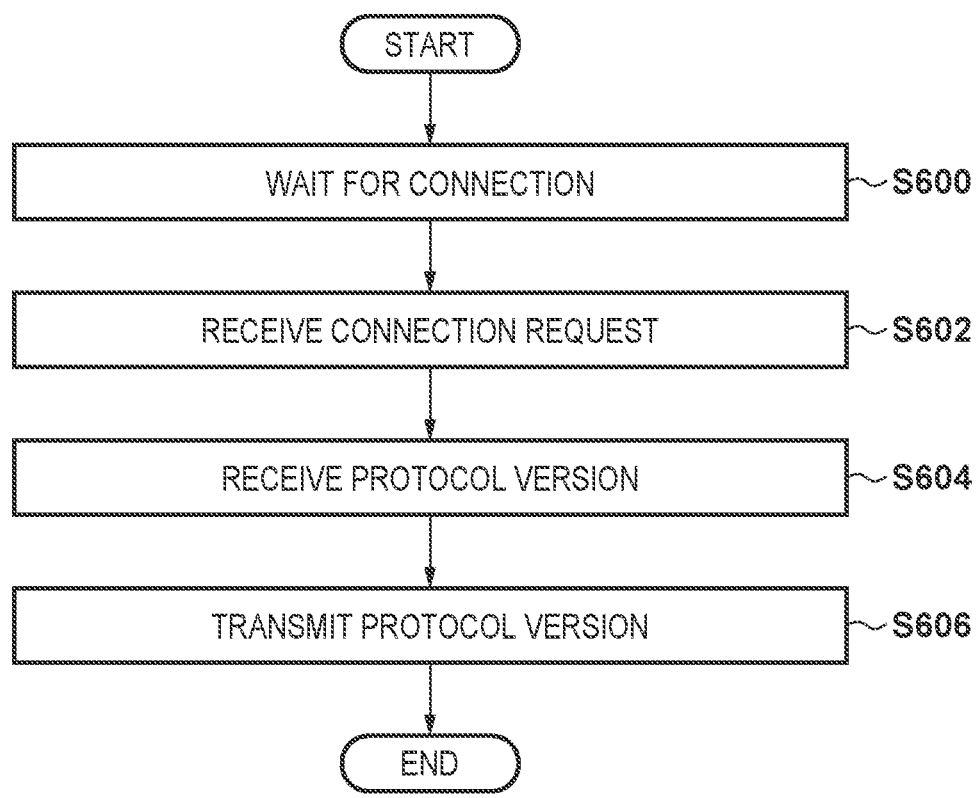
FIG. 6 is a flowchart for explaining an example of processing of a server.
Figure 9:
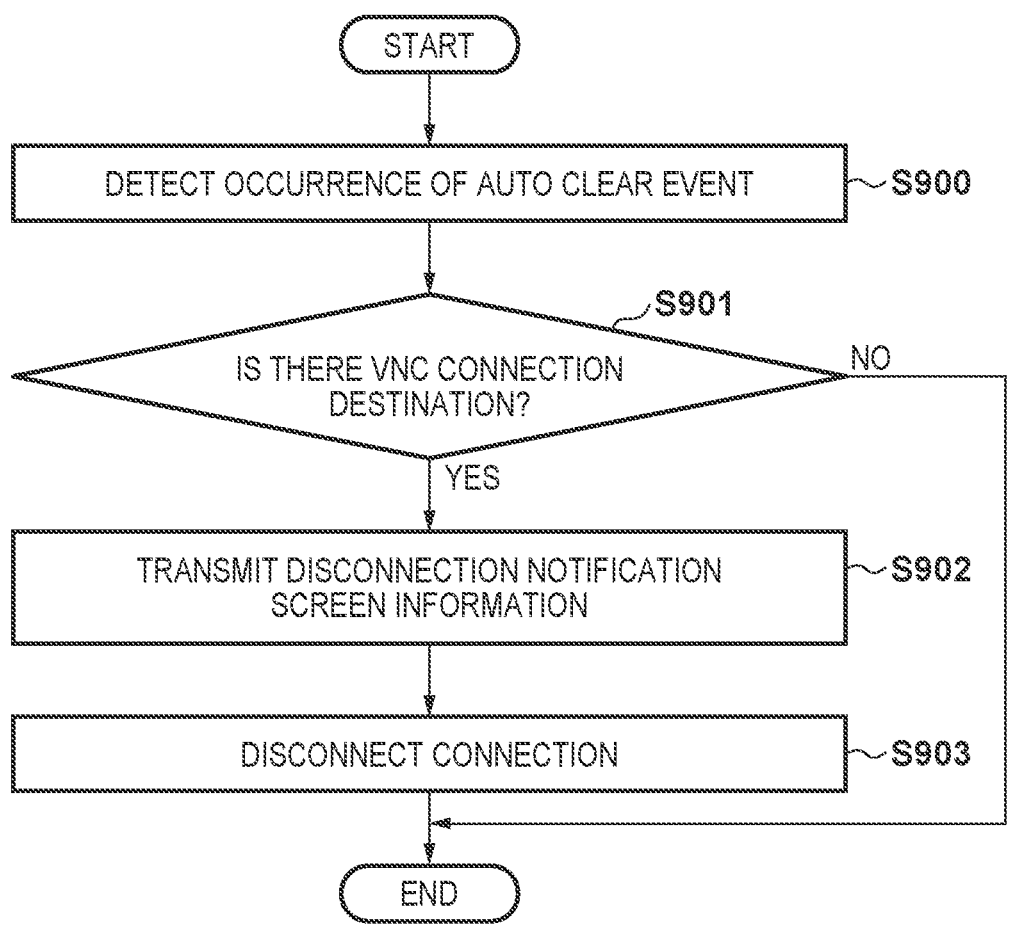
FIG. 9 is a flowchart for explaining an example of processing of the server.
Figure 12:
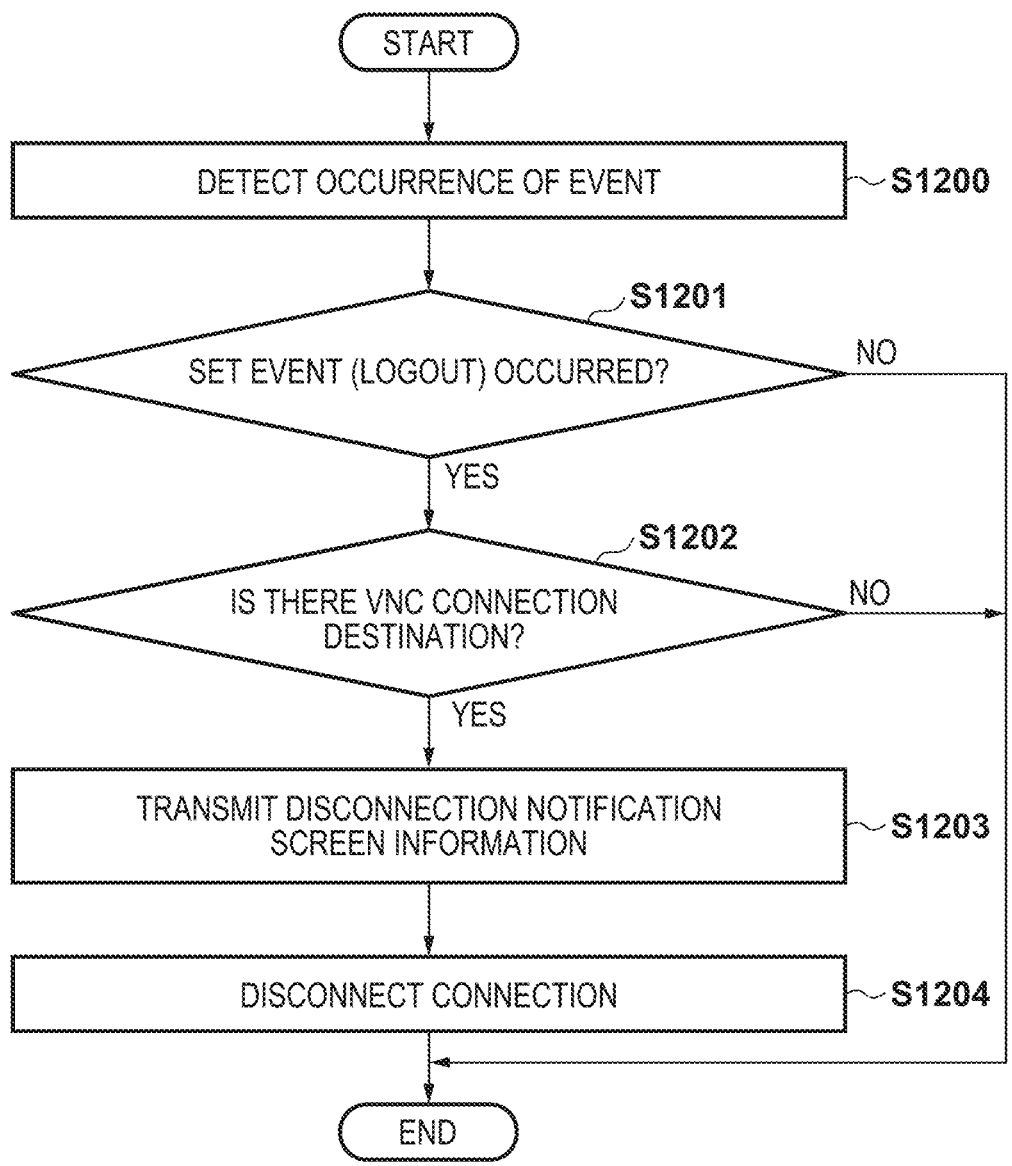
FIG. 12 is a flowchart for explaining an example of processing of the server.

FIG. 3 is a software configuration diagram of the image forming apparatus 102. System software 301 is stored in a storage unit, such as the RAM 203, the ROM 204, or the HDD 205, and is executed by the CPU 202. The CPU 202 realizes a function of each functional unit of the system software 301 illustrated in FIG. 3 by executing a program stored in the storage unit. For example, processing of flowcharts illustrated in FIGS. 6, 9, and 12 is executed by the CPU 202 realizing a function of each functional unit of the system software 301.

A job control processing unit 302 controls each software module, including a software module (not illustrated), and controls jobs, such as copying, printing, and scanning, to be executed by the image forming apparatus 102.

A scan processing unit 303 performs processing for reading a document placed on a document table of the scanner 210 by controlling the scanner 210 via the device I/F 209 based on an instruction from the job control processing unit 302. A print processing unit 304 performs processing for printing a designated image by controlling the printer 211 via the device OF 209 based on an instruction from the job control processing unit 302.

An operation input analysis unit 305 analyzes information supplied from the operation unit 207 via the operation unit OF 206 and notifies an event processing unit 307 of an event corresponding to the user operation. The information to be analyzed by the operation input analysis unit 305 includes information related to a touch position for when the user touches the touch panel, information regarding a type of physical key pressed by the user, and the like. Aside from operation inputs, an event analysis unit 306 receives various incidents occurring in the image forming apparatus 102 from the job control processing unit 302 and the like, analyzes the incidents, and notifies the event processing unit 307 of events corresponding to the incidents. In the present embodiment, the various incidents to be analyzed by the event analysis unit 306 are incidents that are not caused by a user operation, such as completion of a job and shortage of printing sheets. An auto clear event, which will be described later, is also detected in the event analysis unit 306.

The event processing unit 307 receives an event from the operation input analysis unit 305, the event analysis unit 306, an operation information reception unit 322, or the like. The event processing unit 307 notifies the job control processing unit 302, a screen generation unit 308, or a software keyboard control unit 310 of an event in response to the event and then controls each unit of the image forming apparatus 102.

The screen generation unit 308 performs processing for generating, on the RAM 203, data for a screen to be displayed on the display. A screen display unit 309 reads the screen data generated by the screen generation unit 308 from the RAM 203 and then displays the screen data on the display of the operation unit 207 via the operation unit OF 206.

The software keyboard control unit 310 performs control for displaying a software keyboard screen in response to a notification from the event processing unit 307. The software keyboard control unit 310 also holds information indicating whether the software keyboard is displayed on the display.

A VNC server 320 is a software module for communicating with a VNC client 520, which operates on the mobile terminal 103, via the LAN 105. The VNC server 320 includes a connection processing unit 321, the operation information reception unit 322, and a screen transmission unit 323.

The connection processing unit 321 performs connection processing upon reception of a connection request from a connection processing unit 521 of the VNC client 520.

The operation information reception unit 322 receives operation information from an operation information transmission unit 522 of the VNC client 520 and then notifies the event processing unit 307 of an event corresponding to the user operation. The event to be notified by the operation information reception unit 322 is similar to the event to be notified by the operation input analysis unit 305 and is an event for the user to operate the image forming apparatus 102.

The screen transmission unit 323 performs processing for reading screen data generated by the screen generation unit 308 from the RAM 203 and then transmitting the screen data to a screen reception unit 523 of the VNC client 520.

<1.3. Mobile Terminal (FIGS. 4 and 5)>
<1.3.1. Hardware Configuration (FIG. 4)>

Figure 4:
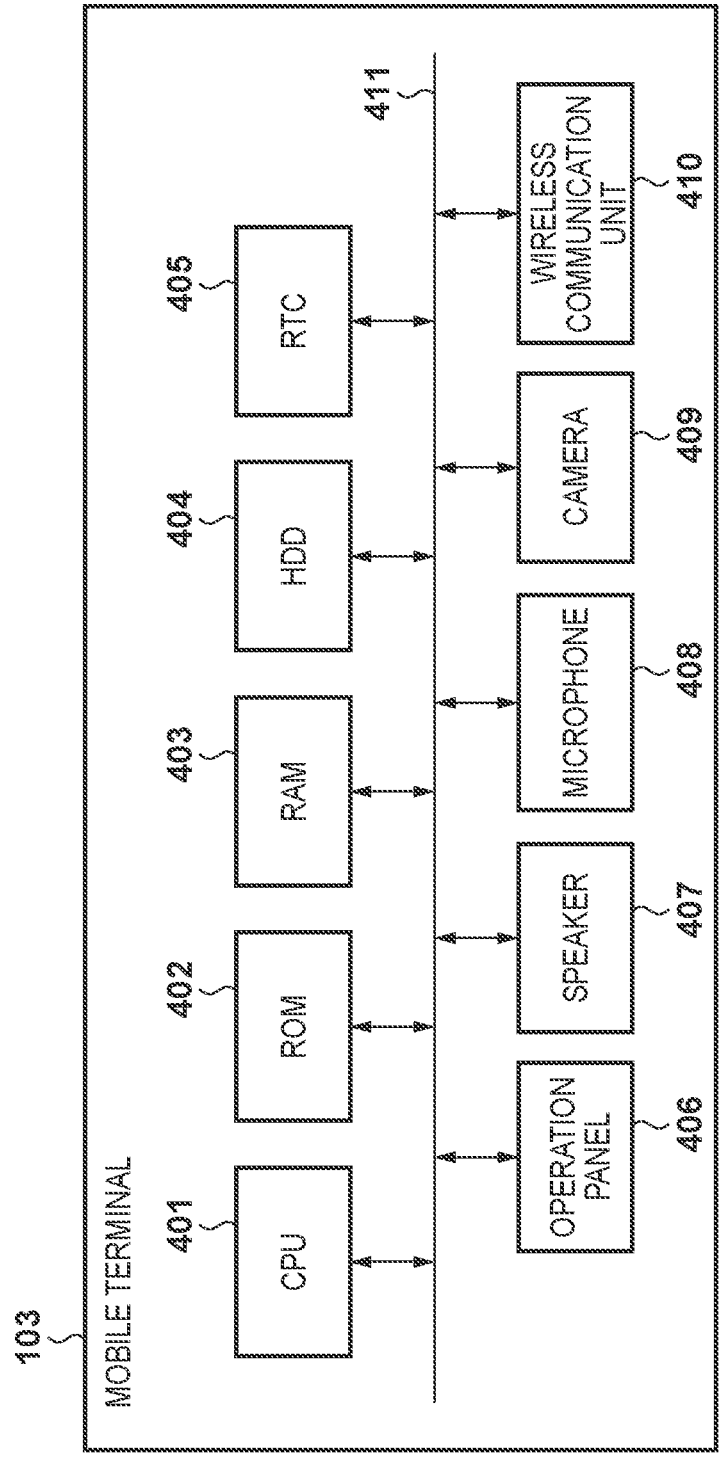
FIG. 4 is a hardware configuration diagram of a mobile terminal.

FIG. 4 is a hardware configuration diagram of the mobile terminal 103.

A CPU 401 is a computation apparatus for controlling the entire system. The CPU 401 collectively controls each device connected to a system bus 411. A ROM 402 is a non-volatile memory and stores image data and other data, various programs for the CPU 401 to perform operation, and the like. A RAM 403 is a volatile memory and is used as a temporary storage region, such as a main memory and a work area of the CPU 401. In addition, programs, such as an operating system, system software, and application software, and data are disposed in the RAM 403.

The CPU 401 controls each unit of the mobile terminal 103 by loading a program stored in the ROM 402 or the like into the RAM 403 and then executing the program. The program for the CPU 401 to perform operation is not limited to a program stored in the ROM 402, and a program stored in advance in a hard disk drive (HDD) 404 or the like may be used.

The hard disk drive (HDD) 404 stores an operating system, system software, application software, images, electronic documents, setting data, and the like. However, the HDD 404 is only one example, and another storage apparatus, such as an SSD, an SD memory card, or an embedded Multi Media Card (eMMC) may be used so long as data can be stored. A real time clock (RTC) 405 measures time.

Figure 5:
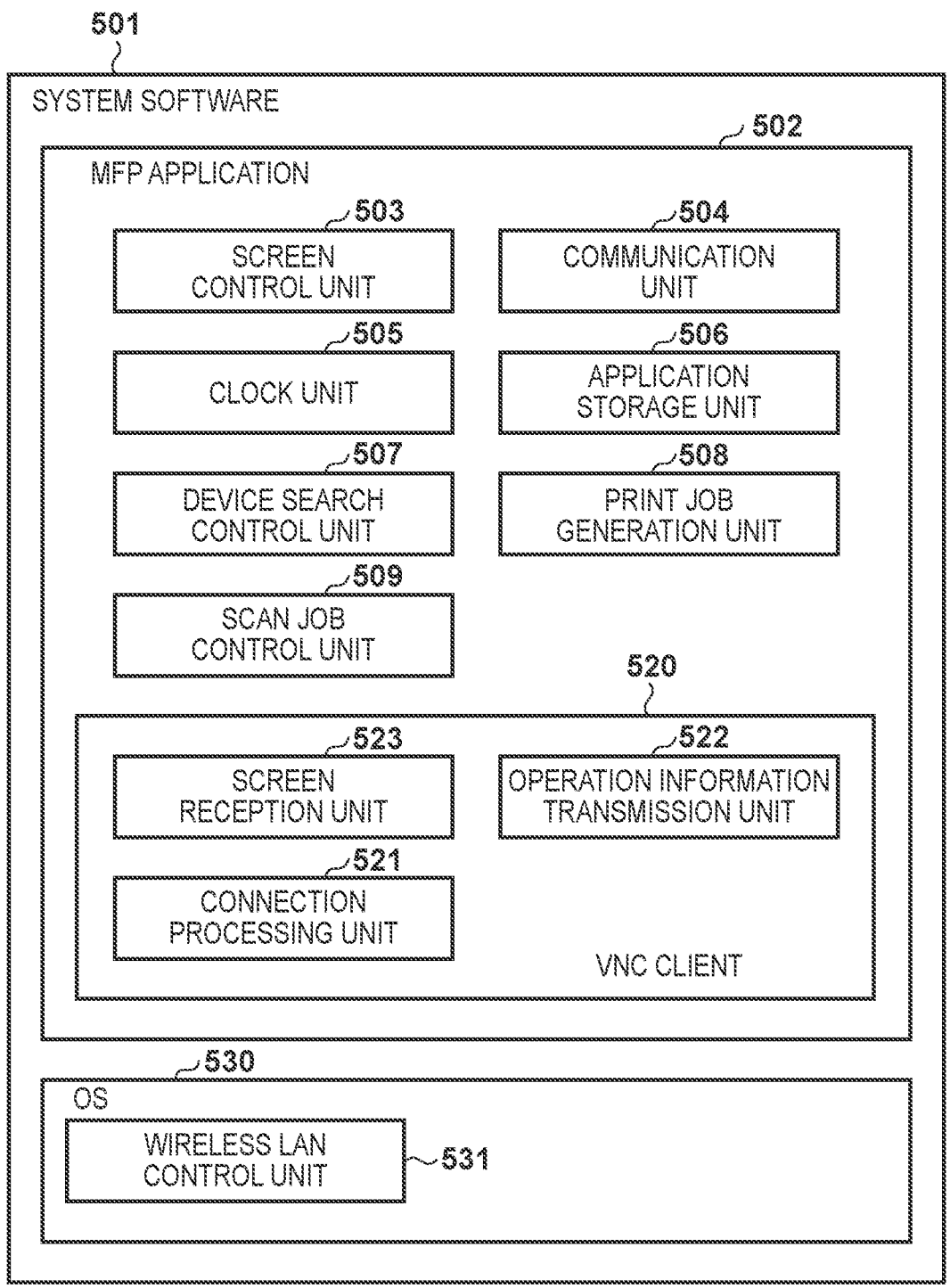
FIG. 5 is a software configuration diagram of the mobile terminal.

An operation panel 406 includes a touch panel function capable of detecting the user's touch operation and displays various screens provided by an OS 530 (see FIG. 5) and an MFP application 502 (see FIG. 5). The user can input a desired operation instruction to the mobile terminal 103 by performing a touch operation on the operation panel 406.

A speaker 407 and a microphone 408 are used when the user calls another mobile terminal or a fixed telephone. A camera 409 captures an image according to an image capturing instruction from the user. The image captured by the camera 409 is stored in a predetermined region of the HDD 404. A wireless communication unit 410 executes wireless communication, such as a wireless communication LAN.

<1.3.2. Software Configuration (FIG. 5)>

Figure 7:
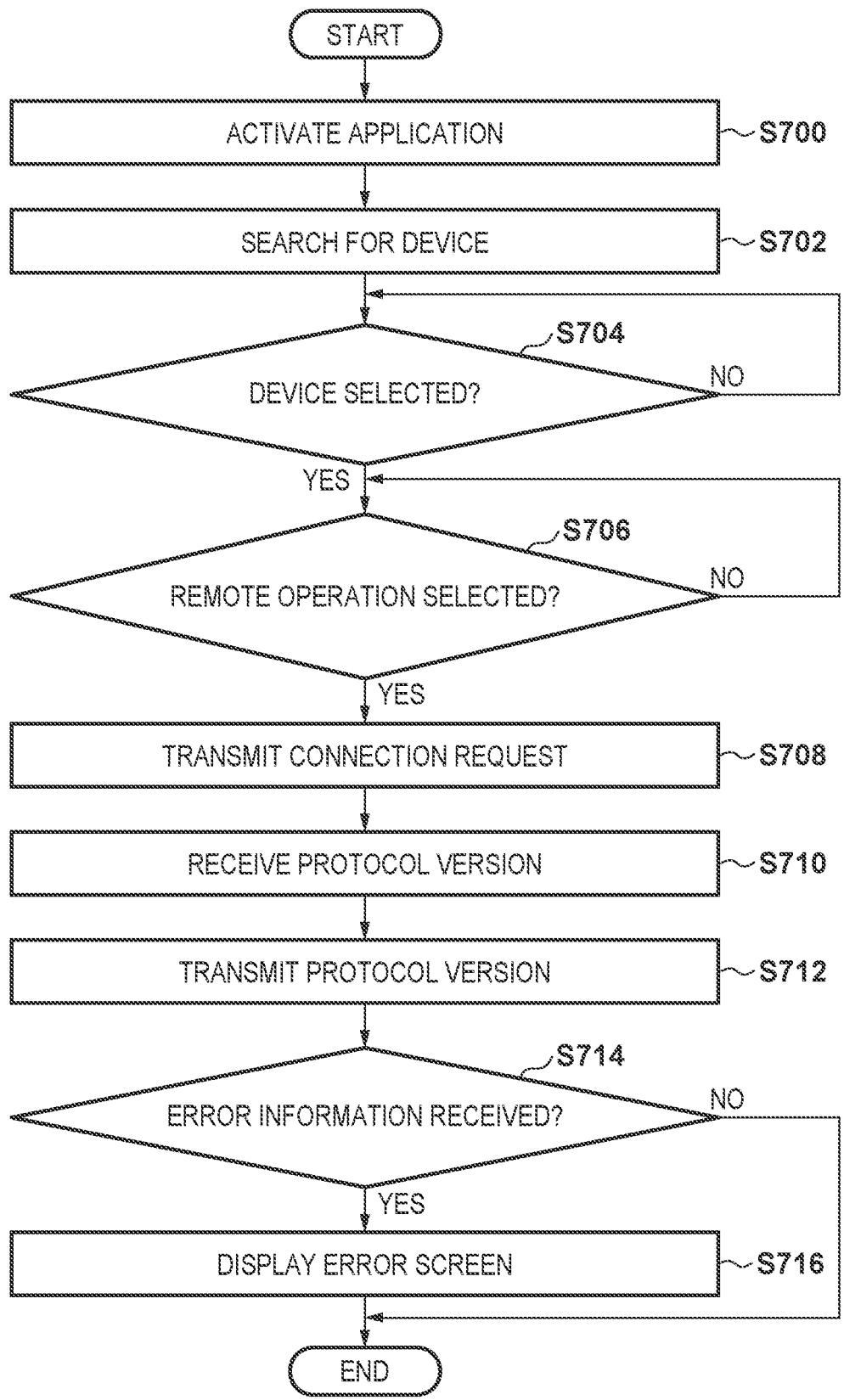
FIG. 7 is a flowchart for explaining an example of processing of a client.
Figure 8A:
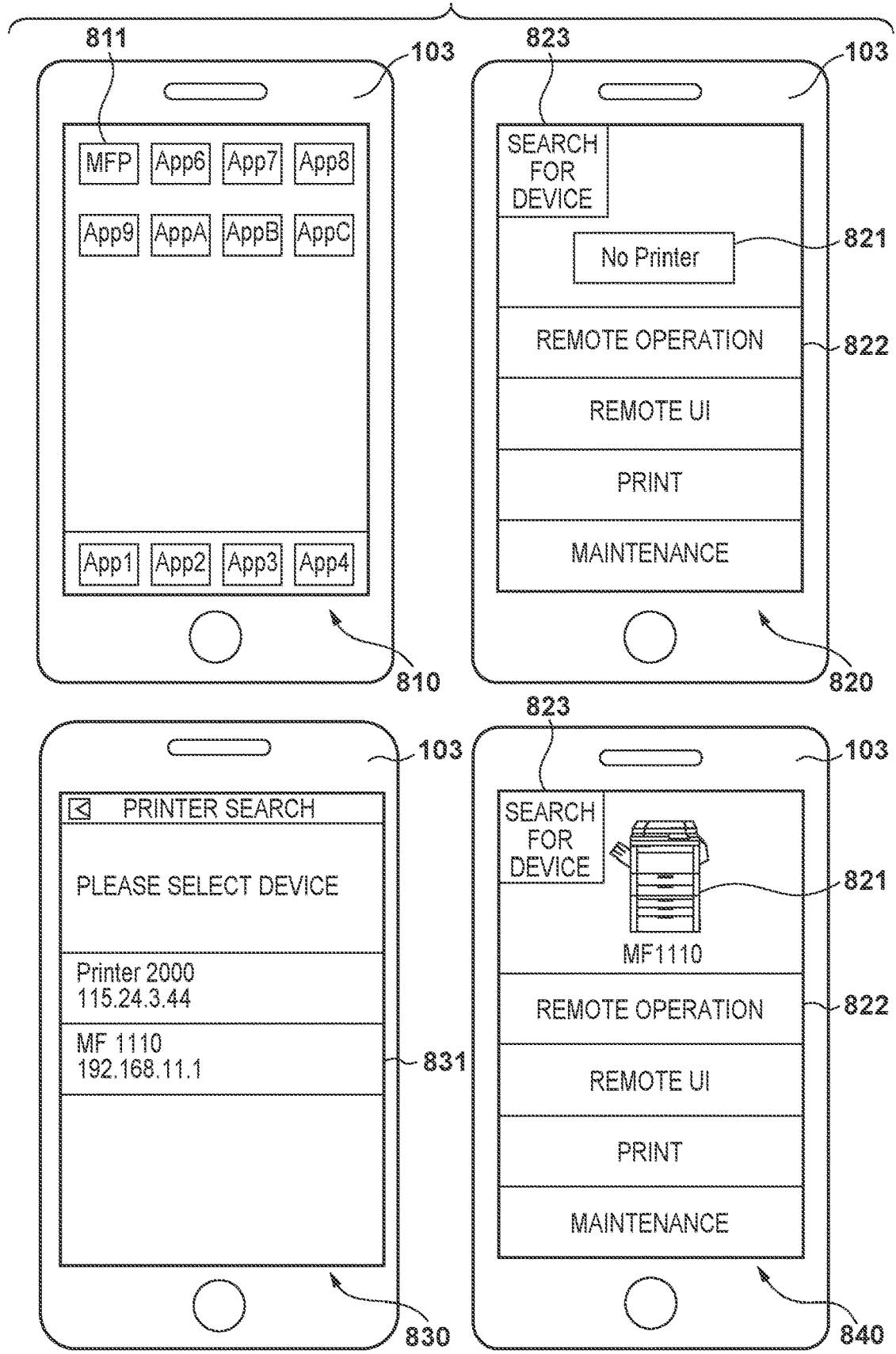
FIG. 8A is a diagram illustrating examples of screens to be displayed on the mobile terminal.
Figure 8B:
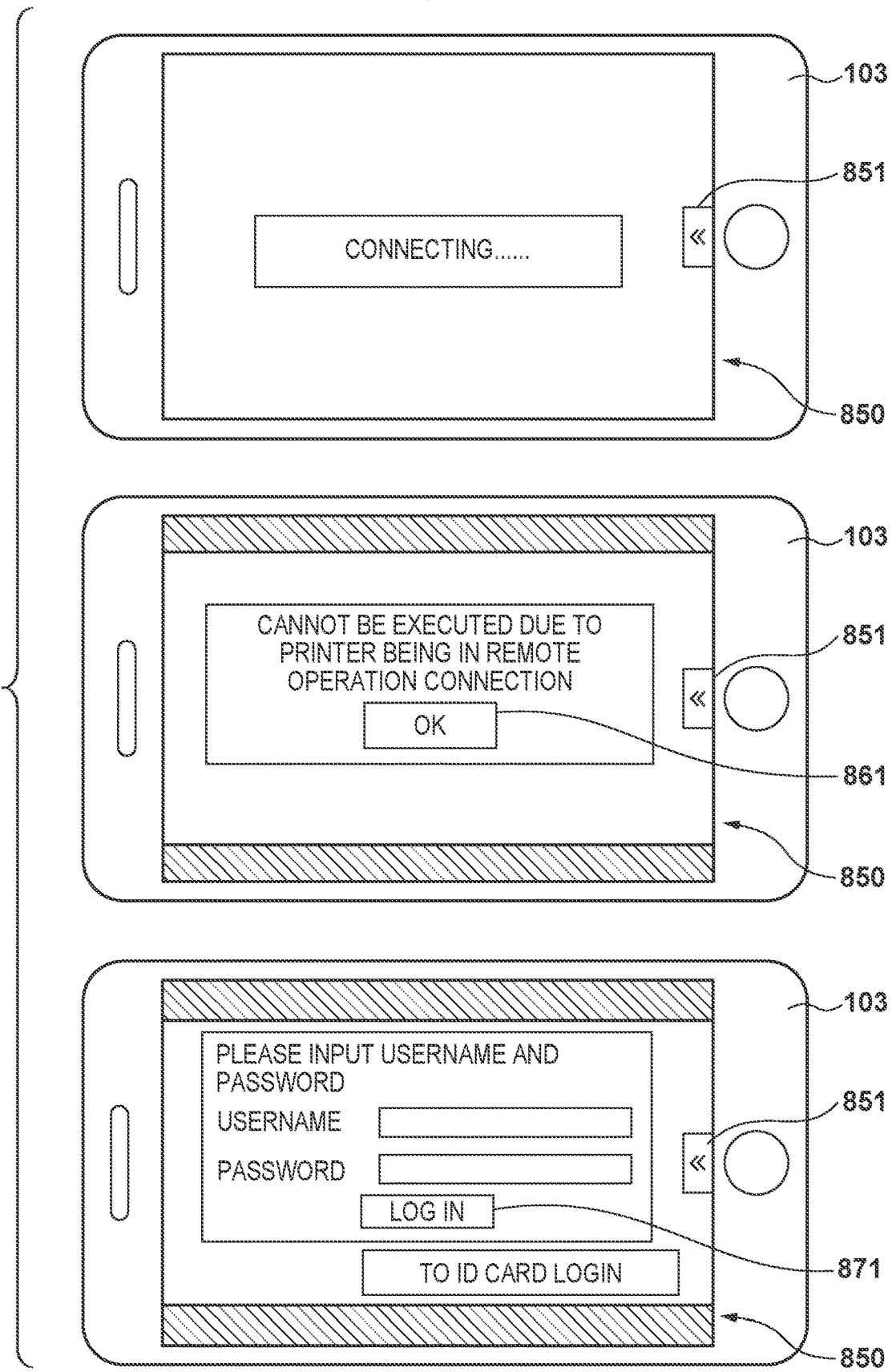
FIG. 8B is a diagram illustrating examples of screens to be displayed on the mobile terminal.

FIG. 5 is a software configuration diagram of the mobile terminal 103. System software 501 is stored in a storage unit, such as the RAM 403, the ROM 402, or the HDD 404, and is executed by the CPU 401. The CPU 401 realizes a function of each functional unit of the system software 501 illustrated in FIG. 5 by executing a program stored in the storage unit. For example, processing of a flowchart illustrated in FIG. 7 is executed by the CPU 401 realizing a function of each functional unit of the system software 501.

The OS 530 is software for controlling the entire operation of the mobile terminal 103. Various applications can be installed in the mobile terminal 103, including the multi-function peripheral (MFP) application 502, which will be described later. The OS 530 exchanges information with these applications and changes a screen displayed on the operation panel 406 according to an instruction received from the application. In addition, the OS 530 includes a device driver group for controlling various kinds of hardware and provides applications that operate on the OS 530 with an application programming interface (API) for using various kinds of hardware. In the present embodiment, a wireless LAN control unit 531 is present as a device driver group. The wireless LAN control unit 531 is a device driver for controlling the wireless communication unit 410.

The MFP application 502 is an application installed on the mobile terminal 103. It is possible to perform printing or scanning on the image forming apparatus 102, a remote operation of an operation screen of the image forming apparatus 102, and the like from the MFP application 502. Although various applications may be installed on the mobile terminal 103 in addition to the MFP application 502, description will be omitted. In the following, a software configuration of the MFP application 502 will be described in more detail.

A screen control unit 503 controls a screen to be displayed on the operation panel 406 via the OS 530. An MFP application screen is displayed on the operation panel 406 by the screen control unit 503. In addition, the screen control unit 503 distinguishes an operation instruction inputted by the user via the operation panel 406. In addition, the screen control unit 503 reads out image data stored in an application storage unit 506 by the screen reception unit 523 and displays the image data on the operation panel 406 via the OS 530.

A communication unit 504 performs, for example, transmission and reception of commands by controlling wireless communication by the wireless communication unit 410 via the OS 530. A clock unit 505 measures time. The application storage unit 506 temporarily stores various kinds of information in the RAM 403.

A device search control unit 507 generates search data for searching for the image forming apparatus 102 to be connected. The device search control unit 507 transmits the generated search data to a device on the LAN 105 by the wireless communication unit 410 and then receives a response from the corresponding image forming apparatus 102. The search data may be broadcasted to all devices on the LAN 105 or may be transmitted after designating an address of a single device.

A print job generation unit 508 generates a print job. The print job generated by the print job generation unit 508 is transmitted to the image forming apparatus 102 by the wireless communication unit 410, and printing based on the print job is executed in the image forming apparatus 102.

A scan job control unit 509 makes a scan instruction to the image forming apparatus 102 by the wireless communication unit 410 and then causes the operation panel 406 to display scan data received from the image forming apparatus 102. When storing the scan data, the scan data is stored in the application storage unit 506.

The VNC client 520 is a software module for communicating with the VNC server 320, which operates on the image forming apparatus 102, via the LAN 105. The VNC client 520 includes the connection processing unit 521, the operation information transmission unit 522, and the screen reception unit 523.

The connection processing unit 521 transmits a connection request to the connection processing unit 321 of the VNC server 320 upon reception of a request from the user and performs connection processing.

The operation information transmission unit 522 receives an operation instruction inputted by the user via the operation panel 406 from the screen control unit 503 and then transmits the operation instruction to the operation information reception unit 322 of the VNC server 320.

The screen reception unit 523 receives screen data from the screen transmission unit 323 of the VNC server 320 and then stores the screen data in the application storage unit 506.

Communication between the VNC server 320 and the VNC client 520 is realized, for example, by the CPU 202 and the CPU 401 controlling the network OF 208 and the wireless communication unit 410, respectively.

By processing of each software module as described above, a screen that is the same as a screen displayed on the display of the operation unit 207 of the image forming apparatus 102 is also displayed on the operation panel 406 of the mobile terminal 103. Then, by the user performing an operation by using the operation panel 406 of the mobile terminal 103, various operations of the image forming apparatus 102 can be performed remotely. The screen to be displayed on the operation panel 406 may be a screen corresponding to a screen displayed on the display of the operation unit 207. That is, the two screens need not be completely identical, and a layout of display contents may be appropriately changed according to, for example, an aspect ratio of the operation panel 406. Alternatively, some of the contents displayed on the display of the operation unit 207 may be displayed on the operation panel 406. That is, some of the operations of the image forming apparatus 102 may be limited in remote operation.

When operating the image forming apparatus 102 by using the operation panel 406 of the mobile terminal 103, at least a portion of a screen displayed on the display of the operation unit 207 of the image forming apparatus 102 may be switched to a mask screen. In addition, at least some of the user operations on the operation unit 207 of the image forming apparatus 102 may be disabled during remote operation.

<1.4. Handshake Processing (FIGS. 6 to 8B)>

Next, handshake processing based on RFB protocol will be described in detail. Here, a case where handshake processing is performed between the image forming apparatus 102 as a server and the mobile terminal 103 as a client will be described. The handshake processing is performed by the connection processing unit 321 of the image forming apparatus 102 and the connection processing unit 521 of the mobile terminal 103. Communication processing of the connection processing unit 321 and the connection processing unit 521 is realized by the CPU 202 and the CPU 401 controlling the network I/F 208 and the wireless communication unit 410, respectively.

<1.4.1. Example of Processing of Image Forming Apparatus (FIG. 6)>

First, an example of processing of the image forming apparatus 102, which functions as the VNC server will be described. FIG. 6 is a flowchart for explaining server connection processing to be executed by the CPU 202 of the image forming apparatus 102. This flowchart starts, for example, when the image forming apparatus 102 is powered on by the user and the VNC server is activated by a system of the image forming apparatus 102 (not illustrated).

In step S600, the connection processing unit 321 opens a port for VNC connection and then transitions to a connection standby state in which a connection request from a client is awaited.

In step S602, the connection processing unit 321 receives a connection request from the client. Specifically, when the user starts a remote operation function by operating the mobile terminal 103, which is one of the clients, a connection request is transmitted from the connection processing unit 521 to the connection processing unit 321. The connection processing unit 321 receives the connection request.

In step S604, the connection processing unit 321 transmits a protocol version to the connection processing unit 521. The protocol version transmitted by the connection processing unit 321 is a version number of the RFB protocol supported by the server (image forming apparatus 102). For example, if the server supports the RFB protocol 3.3, "RFB 003.003\n" is transmitted.

In step S606, the connection processing unit 321 receives a protocol version from the connection processing unit 521. The protocol version received by the connection processing unit 321 is a version number of the RFB protocol to be actually used in the communication between the server (image forming apparatus 102) and the client (mobile terminal 103). For example, if the RFB protocol 3.3 is to be used, "RFB 003.003\n" is received. In addition, in the present embodiment, the protocol version received from the client is used; however, another client message of the RFB protocol may be used. For example, an initialization message of the client; ClientCutText; a new message of the RFB protocol, which will have been extended in the future; an independently developed message not defined in the RFB protocol; and the like may be used.

Then, the connection processing unit 321 performs reception of an initialization message of the client and transmission of an initialization message of the server based on the RFB protocol. Further thereafter, the connection processing unit 321 transmits and receives information, such as a display screen, based on the RFB protocol. Specifically, the operation information reception unit 322 receives the information transmitted by the operation information transmission unit 522 of the VNC client 520. In addition, the screen reception unit 523 of the VNC client 520 receives the information transmitted by the screen transmission unit 323.

With the above, it is possible to transmit and receive information, such as a display screen. That is, a remote operation of the image forming apparatus 102 by the mobile terminal 103 can be executed.

<1.4.2. Example of Processing of Mobile Terminal (FIGS. 7 and 8)>

Next, an example of processing of the mobile terminal 103, which is the VNC client, will be described. FIG. 7 is a flowchart for explaining client connection processing to be executed by the CPU 401 of the mobile terminal 103. In the following, description will be given with appropriate reference to examples of screens to be displayed on the operation panel 406 of the mobile terminal 103 illustrated in FIGS. 8A and 8B. When the mobile terminal 103 is activated, a home screen 810 is displayed. An MFP application icon 811 is an icon that represents the MFP application 502. The flowchart starts, for example, based on selection of the MFP application icon 811 on the home screen 810 by the user.

In step S700, the OS 530 activates the MFP application 502. When the MFP application 502 is activated by the OS 530, the screen control unit 503 displays an application home screen (device not selected) 820 on the operation panel 406.

The application home screen (device not selected) 820 will be described. A selected device icon 821 displays the currently selected device. When a device is not selected, "No Printer" is displayed in the selected device icon 821. A device search button 823 is a button for searching for a device. A remote operation menu 822 is a menu for using the remote operation.

In step S702, when the screen control unit 503 detects that the device search button 823 of the application home screen (device not selected) 820 has been tapped, the device search control unit 507 executes a device search. In addition, the screen control unit 503 displays a device search screen 830 on the operation panel 406.

The device search screen 830 displays a list of found devices. A search result 831 shows the image forming apparatus 102, and by selecting the image forming apparatus 102, the image forming apparatus 102 can be selected as a device.

In step S704, the screen control unit 503 determines whether a device has been selected in the device search screen 830. If the screen control unit 503 determines that a device has been selected (e.g., that it is detected that the user has tapped on the search result 831), the processing proceeds to step S706; otherwise, the determination of step S704 is repeated. When a device is not selected for a certain period of time, the screen control unit 503 may display an error screen on the operation panel 406 or return the display of the operation panel 406 to the application home screen (device not selected) 820.

In step S706, the screen control unit 503 displays an application home screen (device selected) 840 on the operation panel 406 and then determines whether the remote operation menu 822 has been selected on the application home screen (device selected) 840. When the remote operation menu 822 has been selected, the screen control unit 503 proceeds to step S708; otherwise, the screen control unit 503 repeats the determination of step S706.

In step S708, the connection processing unit 521 transmits a connection request to the server. At this time, the screen control unit 503 displays a device-connection-in-progress screen 850 on the operation panel 406. A physical key display button 851 on the device-connection-in-progress screen 850 is a button for displaying a physical key screen (not illustrated) for operating the physical keys of the image forming apparatus 102 from the mobile terminal 103.

In step S710, the connection processing unit 521 receives a protocol version from the server. The protocol version received here is that transmitted from the server (image forming apparatus 102) in step S604 of FIG. 6. For example, in a case of a server that supports the RFB protocol 3.3, the connection processing unit 521 receives "RFB 003.003\n" as the version number of the RFB protocol.

In step S712, the connection processing unit 521 transmits a protocol version. The protocol version transmitted here is that received by the server (image forming apparatus 102) in step S606 of FIG. 6. As described previously, the protocol version transmitted by the client is a version number of the RFB protocol to be actually used in the communication between the server and the client. For example, if the RFB protocol 3.3 is to be used, the connection processing unit 521 transmits "RFB 003.003\n".

Here, a portion of the protocol version transmitted by the client can be designation of order of priority of connection. Specifically, a first byte of a minor version of the protocol version transmitted by the client is designation of order of priority of connection. When the first byte is 0, later-priority is assumed, and when the first byte is 1, former-priority is assumed. That is, when the protocol version transmitted by the client is "RFB 003.003\n", later-priority is assumed, and when the protocol version is "RFB 003.103\n", former-priority is assumed. When it is desired that connection of the mobile terminal 103 be former-priority, the connection processing unit 521 transmits "RFB 003.103\n" as the protocol version.

Former-priority is a control format in which the server prioritizes connection with a client with which a connection has been established first and a connection cannot be established even if another client makes a request for connection with the server thereafter. In addition, later-priority is a control format in which the server prioritizes connection with a client with which a VNC connection has been established later, and if there is a client that makes a connection request thereafter, connection with the client with which a connection has been established earlier is disconnected and connection with the client that has made a connection request later is established.

As described previously, a plurality of functions may be switched by using the first byte of the minor version as a method of designating order of priority of connection. Alternatively, a second byte from the start of the minor version may be used. Another client message of the RFB protocol may also be used.

In step S714, the connection processing unit 521 determines whether error information has been received from the server. If error information has been received from the server, the connection processing unit 521 proceeds to step S716; otherwise, the connection processing unit 521 terminates the flowchart. For example, the connection processing unit 521 makes the determination based on a security type received from the server. For example, when "3", which extends the specification, is received as the security type, the connection processing unit 521 determines that it is an error indicating that a connection has already been established in former-priority.

In step S716, the connection processing unit 521 disconnects the connection based on the connection request transmitted in step S708, and the screen control unit 503 displays an error screen 860 on the operation panel 406. In the error screen 860, an OK button 861 is a button for closing the error screen 860. When the OK button 861 is pressed, the screen control unit 503 closes the error screen 860 of the operation panel 406 and displays the application home screen (device selected) 840. Then, the connection processing unit 521 ends handshake processing based on the connection request transmitted in step S708.

When VNC authentication is received as a security type in step S714, a password input screen (not illustrated) is displayed on the operation panel 406, and processing for verifying the password by transmitting information based on the password inputted by the user to the server needs to be performed. In this case, when authentication is successful, the connection processing unit 521 directly terminates the flowchart from step S714, and when authentication fails, the connection processing unit 521 proceeds to step S716. Since this processing is known processing based on the RFB protocol, detailed explanation will be omitted.

If error information has not been received in step S714, handshake processing based on the connection request transmitted in step S708 is successfully completed. Then, reception of an initialization message of the client and transmission of an initialization message of the server are performed based on the RFB protocol. Further thereafter, information, such as a display screen, is transmitted and received based on the RFB protocol. Specifically, the operation information reception unit 322 of the VNC server 320 receives the information transmitted by the operation information transmission unit 522. In addition, the screen reception unit 523 receives the information transmitted by the screen transmission unit 323 of the VNC server 320. With the above, it is possible to transmit and receive information, such as a display screen. For example, when a keyboard login screen is displayed on the display of the operation unit 207 of the image forming apparatus 102, a keyboard login screen 870 that is the same as that keyboard login screen can be displayed on the operation panel 406 of the mobile terminal 103. When a user name and a password are inputted and a login button 871 is pressed, the inputted information is transmitted to the server, and thus, it becomes possible to perform a remote operation of the image forming apparatus 102 in the same manner as in a case of operating the operation unit 207 of the image forming apparatus 102.

<1.5. Automatic Disconnection Processing (FIGS. 9 and 10)>

FIG. 9 is a flowchart for explaining an example of processing for when automatically disconnecting a VNC connection in the server (image forming apparatus 102). In the present embodiment, when occurrence of a predetermined event that corresponds to a state of use of the image forming apparatus 102 in remote operation is detected in the image forming apparatus 102, the VNC connection is disconnected. In the following, an example of processing for when the VNC connection is disconnected when an auto clear function, which is an example of a predetermined event, is executed will be described. The auto clear function is a function for causing an operation screen of a device to transition to a set default screen (e.g., a home screen) according to a predetermined condition. The predetermined condition includes, for example, there being not even one operation within a set time. More specifically, the predetermined condition includes, for example, the event processing unit 307 not accepting even one operation of the image forming apparatus 102 from the operation input analysis unit 305 and the operation information reception unit 322 within a set time.

In step S900, the event analysis unit 306 detects an event that has occurred in the image forming apparatus 102. Here, it is assumed that the event analysis unit 306 detects occurrence of an auto clear event.

In step S901, the event processing unit 307 determines whether there is a connection destination of a VNC connection, and if there is a connection destination, the processing proceeds to step S902, and otherwise, the flowchart ends.

Figure 10:
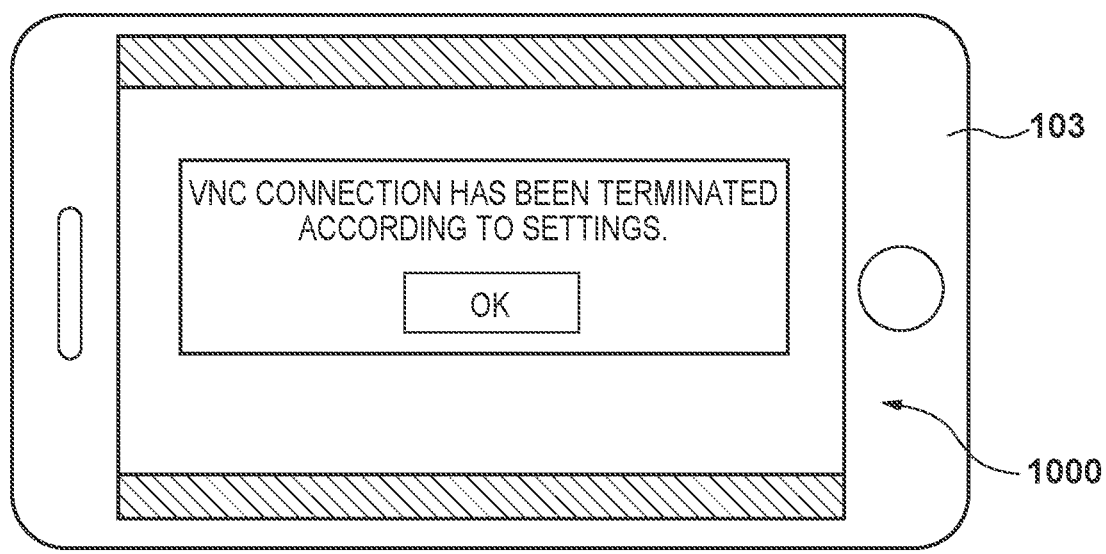
FIG. 10 is a diagram illustrating an example of a screen to be displayed on the mobile terminal.

In step S902, the screen transmission unit 323 transmits disconnection notification screen information to the client (mobile terminal 103). Here, FIG. 10 is a diagram illustrating a screen example of a disconnection notification screen to be displayed at the time of automatic VNC disconnection in the present embodiment. For example, the screen transmission unit 323 transmits, to the client, disconnection notification screen information regarding a disconnection notification screen generated by the screen generation unit 308 based on an instruction from the event processing unit 307. The mobile terminal 103, which is the client that has received the disconnection notification screen information, displays a disconnection notification screen 1000 on the operation panel 406. After receiving the disconnection notification screen information, the mobile terminal 103 displays the disconnection notification screen 1000 after detecting that the connection has been disconnected. However, after receiving the disconnection notification screen information, the mobile terminal 103 may display the disconnection notification screen 1000 regardless of whether the connection with the image forming apparatus 102 has been disconnected.

In step S903, the connection processing unit 321 disconnects the VNC connection with the mobile terminal 103, which is the client. At this time, a default screen, which has been set in advance, is displayed on the display of the operation unit 207 of the image forming apparatus 102 as a result of the event processing unit 307 having processed the auto clear event.

As described above, in the present embodiment, the image forming apparatus 102 disconnects the connection with the mobile terminal 103 in response to occurrence of a predetermined event in the image forming apparatus 102 in a state in which the image forming apparatus 102 can be remotely operated by the mobile terminal 103. This makes it possible to, when the operation of the mobile terminal 103 is terminated, the mobile terminal 103 is not used, or the like in a state in which the mobile terminal 103 can perform a remote operation of the image forming apparatus 102, disconnect the connection with the mobile terminal 103 from the image forming apparatus 102 side. Thus, the security of the image forming apparatus 102 can be ensured.

In addition, for example, it is conceivable to automatically disconnect the connection when a connected state of the image forming apparatus 102 and the mobile terminal 103 continues for a certain period of time in view of security. However, in this method, it is anticipated, for example, that the connection between the image forming apparatus 102 and the mobile terminal 103 will be disconnected during remote operation, and thus, convenience may deteriorate. With respect to this, in the present embodiment, the image forming apparatus 102 disconnects the connection with the mobile terminal 103 when occurrence of a predetermined event that corresponds to a state of use of the image forming apparatus 102 is detected. Accordingly, connection between the two can be disconnected, for example, when it is predicted that the user has no intention of performing remote operation, and thus, it is possible to prevent convenience from deteriorating. It is possible to thus achieve a balance between convenience and security when remotely operating an image forming apparatus.

In the present embodiment, the auto clear function has been described as an example of a predetermined event that corresponds to a state of use of the image forming apparatus 102; however, for example, a logout from the image forming apparatus 102 by the user, pressing of a home button on a remote operation screen, or the like may be a target of determination for automatic disconnection. That is, it may be determined whether to disconnect a VNC connection between the image forming apparatus 102 and the mobile terminal 103 according to a possibility that the user will continuously perform a remote operation after occurrence of an event has been detected.

2. Second Embodiment (FIGS. 11 and 12)

In the first embodiment, the image forming apparatus 102 disconnects the VNC connection when the auto clear function is executed. However, the time until auto clear occurs in units of seconds may be set for some users, and such users may feel inconvenienced due to the VNC connection frequently being disconnected. Thus, in the following, a method of setting in advance a function to be a target of determination as to whether to automatically disconnect the VNC connection will be described.

Figure 11:
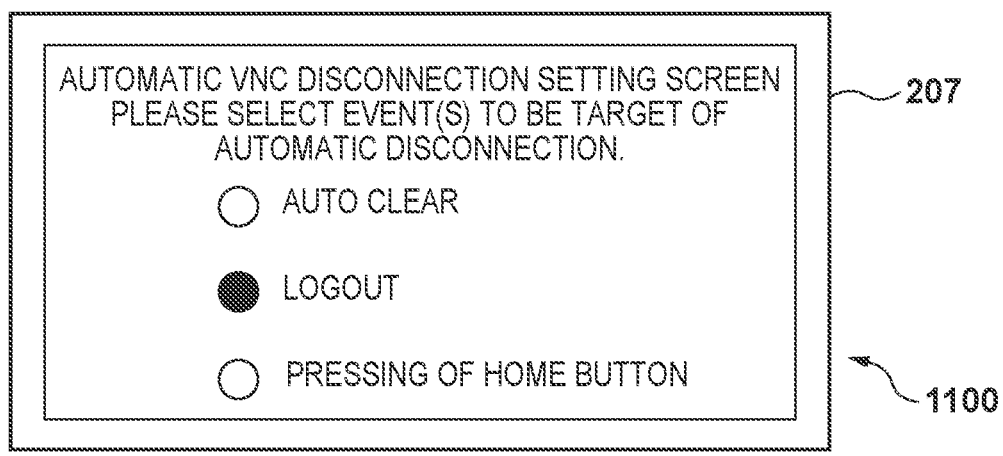
FIG. 11 is a diagram illustrating an example of a screen to be displayed on the mobile terminal.

FIG. 11 is a diagram illustrating a setting screen 1100 for setting a function (event) to be a target of automatic disconnection. In the present embodiment, three options for an event to be detected are auto clear, logout, and pressing of a home button, and the user can select one or more of the options. Logout is a release of a login state in which the user can operate the image forming apparatus 102. The home button is a button for transitioning to a base screen (home screen) of the image forming apparatus 102. In addition, FIG. 11 illustrates a state in which only logout is set as a target of automatic disconnection.

FIG. 12 is a flowchart for explaining an example of processing for when automatically disconnecting a VNC connection in the server (image forming apparatus 102).

In step S1200, the event analysis unit 306 detects an event that has occurred in the image forming apparatus 102.

In step S1201, the event processing unit 307 determines whether the event detected by the event analysis unit 306 is an event set as an event to a target of automatic disconnection of the VNC connection. If the detected event is an event set as a target of automatic disconnection, the event processing unit 307 proceeds to step S1202; otherwise, the event processing unit 307 ends the flowchart. In a case of a setting illustrated in FIG. 11, when it is detected that the user has logged out of the image forming apparatus 102, the event processing unit 307 proceeds to step S1202.

Step S1202 to step S1204 are processes similar to the processes of step S901 to step S903, respectively, of FIG. 9.

According to the present embodiment, when occurrence of an event that has been set in advance in the setting screen 1100 is detected, the image forming apparatus 102 disconnects the VNC connection from the mobile terminal 103. Accordingly, it is possible to perform processing for disconnecting a VNC connection more appropriately according to each user's state of use of a device. It is possible to thus achieve a balance between convenience and security when remotely operating an image forming apparatus.

3. Third Embodiment (FIGS. 13 and 14)

In the above-described embodiments, by disconnecting the VCN connection based on occurrence of a predetermined event that corresponds to a state of use of the image forming apparatus 102, improvement of security is achieved while ensuring convenience. When a predetermined event that corresponds to a state of use of the image forming apparatus 102 occurs, it is considered that there is a relatively low possibility that the user intends to continue a remote operation of the image forming apparatus 102. However, depending on the situation, it is conceivable that the user may intend to continue remote operation even after a predetermined event has occurred. Therefore, in the present embodiment, when a predetermined event occurs, the VNC connection is disconnected after issuing a prenotice that the VNC connection will be disconnected.

Figure 13:
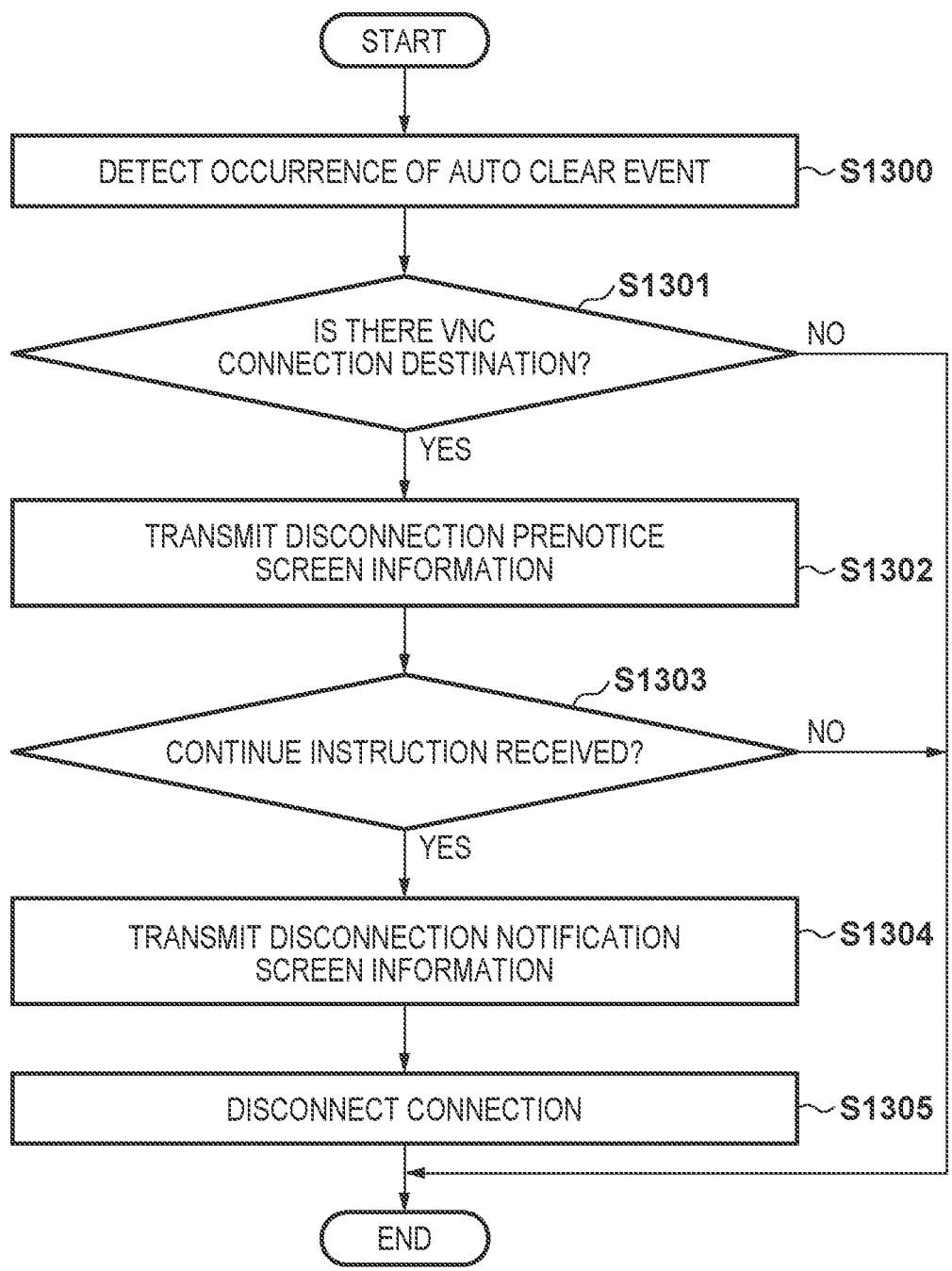
FIG. 13 is a flowchart for explaining an example of processing of the server.
Figure 14:
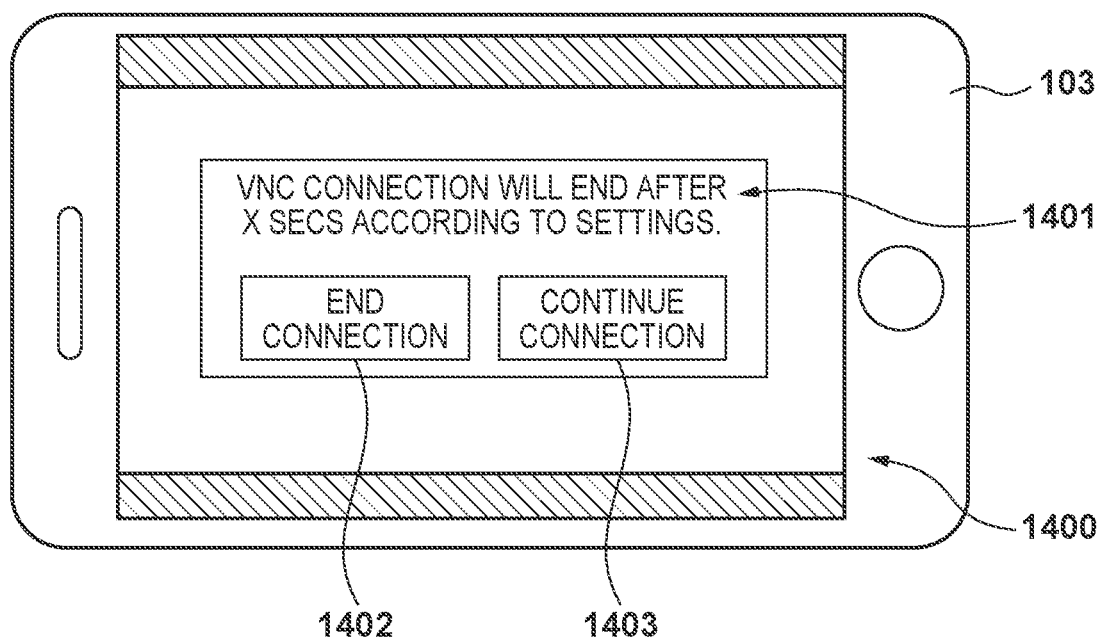
FIG. 14 is a diagram illustrating an example of a screen to be displayed on the mobile terminal.

FIG. 13 is a flowchart for explaining an example of processing for when automatically disconnecting a VNC connection in the server (image forming apparatus 102).

Steps S1300 and S1301 are similar to steps S900 and S901.

In step S1302, the screen transmission unit 323 transmits disconnection prenotice screen information to the client (mobile terminal 103). The disconnection prenotice screen information is an example of information for issuing a prenotice that the VNC connection of the image forming apparatus 102 and the mobile terminal 103 will be disconnected.

FIG. 14 is a diagram illustrating a screen example of a disconnection prenotice screen according to the present embodiment. Upon reception of disconnection prenotice screen information from the image forming apparatus 102, the mobile terminal 103 displays a disconnection prenotice screen 1400 on the operation panel 406. The disconnection prenotice screen 1400 includes a message 1401 for a prenotice that the VNC connection will end, an end button 1402 for accepting an instruction for ending the VNC connection, and a continue button 1403 for accepting an instruction for continuing the VNC connection. That is, the disconnection prenotice screen 1400 can be said to be a confirmation screen for confirming with the user whether to continue the VNC connection.

When the end button 1402 is selected or when none of the buttons is selected within a predetermined period, the operation information transmission unit 522 of the mobile terminal 103 transmits information indicating the end of the VNC connection to the operation information reception unit 322. When the continue button 1403 is selected, the operation information transmission unit 522 transmits information (continue instruction) indicating continuation of the VNC connection to the operation information reception unit 322. That is, the operation information transmission unit 522 transmits, to the operation information reception unit 322, information related to a result of confirmation as to whether to continue the VNC connection.

In step S1303, if the operation information reception unit 322 receives a continue instruction, the event processing unit 307 ends the flowchart; otherwise, the event processing unit 307 proceeds to step S1304. Steps S1304 and S1305 are similar to steps S902 and S903.

Here, when the operation information reception unit 322 receives the continue instruction, the flowchart ends without performing processing of step S1305. That is, the disconnection of the VNC connection for which a prenotice has been issued in the disconnection prenotice screen 1400 is cancelled.

As described above, according to the present embodiment, even when occurrence of a predetermined event that corresponds to a state of use of the image forming apparatus 102 is detected, it is possible to control disconnection of the VNC connection in a manner in which the user's intention is reflected.

Here, the auto clear function has been described as an example of a predetermined event that corresponds to a state of use of the image forming apparatus 102; however, as in the first embodiment, an event to be a target of determination of automatic disconnection can be set as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-155295, filed Sep. 28, 2022 which is hereby incorporated by reference herein in its entirety.

What is claimed is:

1. An image forming apparatus comprising:
at least one memory storing instructions; and
at least one processor that executes the instructions to:
make a connection with an information processing apparatus for executing a remote operation of the image forming apparatus by the information processing apparatus using virtual network computing (VNC);
detect an event, including an auto clear event that causes a screen of a display device of the information processing apparatus to transition to a default screen, in a state where the image forming apparatus does not receive any operation from a user of the information processing apparatus for a predetermined period of time;
disconnect, in a state where the auto clear event has been detected while the image forming apparatus is VNC connected with the information processing apparatus, the VNC connection with the information processing apparatus; and
provide a setting screen for setting whether a condition for disconnecting the VNC connection is the auto clear event or a logout event.

2. The image forming apparatus according to claim 1, wherein the default screen is a home screen.

3. The image forming apparatus according to claim 1, wherein:
the at least one processor executes the instructions to set an event a target of disconnection of the VNC connection, among a plurality of events, including the auto clear event,
the at least one processor, in a state where the set event has been detected while the image forming apparatus is VNC connected with the information processing apparatus, the disconnection unit disconnects the VNC connection with the information processing apparatus.

4. The image forming apparatus according to claim 3, wherein:
the remote operation is performed in a state where the user is logged in to the image forming apparatus from the information processing apparatus, and
the event includes the user logging out of the image forming apparatus.

5. The image forming apparatus according to claim 1, wherein, in the state where the auto clear event has been detected, the at least one processor executes the instructions to transmit, to the information processing apparatus, information for notifying that the connection has been terminated, before disconnecting the VNC connection with the information processing apparatus.

6. The image forming apparatus according to claim 1, wherein, in the state where the auto clear event has been detected, the at least one processor executes the instructions to transmit to the information processing apparatus, first information for a prenotice that the VNC connection will be disconnected, before disconnecting the VNC connection with the information processing apparatus.

7. The image forming apparatus according to claim 6, wherein:
the first information includes information for displaying, on the display device of the information processing apparatus, a confirmation screen for confirming whether to continue the VNC connection,
the at least one processor executes the instructions to receive, from the information processing apparatus, second information related to a result of the confirmation on the confirmation screen, and
the at least one processor, in a state where the second information, which indicates to continue the VNC connection has been received, cancels disconnection of the VNC connection for which the prenotice has been transmitted.

8. The image forming apparatus according to claim 1, wherein:
the at least one processor executes the instructions to transmit, to the information processing apparatus, information related to a remote operation screen for performing the remote operation of the image forming apparatus in the information processing apparatus,
the remote operation screen is a screen of the information processing apparatus corresponding to an operation screen of the image forming apparatus.

9. The image forming apparatus according to claim 1, wherein the setting screen further includes a setting item for setting the condition for disconnecting as an event of pressing of a home button.

10. A control method of an image forming apparatus, the method comprising:
- connecting with an information processing apparatus for executing a remote operation of the image forming apparatus by the information processing apparatus using virtual network computing (VNC);
- detecting an auto clear event that causes a screen of a display device of the information processing apparatus to transition to a default screen, in a state where the image forming apparatus does not receive any operation from a user of the information processing apparatus for a predetermined period of time;
- disconnecting, in a state where the auto clear event has been detected while the image forming apparatus is VNC connected with the information processing apparatus, the VNC connection with the information processing apparatus; and
- providing a setting screen for setting whether a condition for disconnecting the VNC connection is the auto clear event or a logout event.

11. A non-transitory computer-readable storage medium storing a program executable a computer to execute a method comprising:
- connecting with an information processing apparatus for executing a remote operation of the image forming apparatus by the information processing apparatus using virtual network computing (VNC);
- detecting an auto clear event that causes a screen of a display device of the information processing apparatus to transition to a default screen, in a state where the image forming apparatus does not receive any operation from a user of the information processing apparatus for a predetermined period of time;
- disconnecting, in a state where the auto clear event has been detected while the image forming apparatus is VNC connected with the information processing apparatus, the VNC connection with the information processing apparatus; and
- providing a setting screen for setting whether a condition for disconnecting the VNC connection is the auto clear event or a logout event.

\* \* \* \* \*